3,049,524
POLYMERIZATION OF STYRENE
Sterling E. Voltz, Chester, Pa., assignor to Sun Oil Company, Philadelphia, Pa., a corporation of New Jersey
No Drawing. Filed Oct. 24, 1958, Ser. No. 769,314
2 Claims. (Cl. 260—93.5)

This invention relates to a process for the polymerization of styrene, and more particularly to novel catalyst systems for inducing such polymerization.

It is known that styrene can be polymerized by the action of aluminum chloride, and recently it has been discovered that complexes of titanium halides with aluminum trialkyls or aluminum dialkyl halides are effective to polymerize styrene. Polymerization with aluminum chloride has the disadvantage that the product does not have a very high average molecular weight, and it is soluble to a considerable degree in hydrocarbon solvents. Polymerization in the presence of the titanium-halide-aluminum trialkyl or aluminum dialkyl halide catalyst has the advantage that the product is highly crystalline and is substantially insoluble in hydrocarbon solvents, but the time required to complete the polymerization is excessively long.

It is an object of this invention to provide a process for polymerization of styrene which permits rapid polymerization, and at the same time, yields a product which is substantially insoluble in hydrocarbon solvents.

It has now been found that the foregoing object may be attained by polymerizing styrene in the presence of either an aluminum alkyl dihalide or a metal halide-aluminum alkyl dihalide catalyst. When using a combination metal halide-aluminum alkyl dihalide catalyst, the ratio of metal halide to aluminum compound may vary from 1:5 to 5:1, a ratio of 1:3 being preferred. Metal halides suitable for use as catalytic components include the chlorides and bromides of metals of groups IVa and Va of the periodic system, the chlorides of titanium, vanadium, zirconium and niobium being preferred. It has been found that in the presence of these catalysts styrene can be almost completely polymerized at about 50° C. in a matter of minutes, and that the polymerization product is over 90 percent insoluble in boiling n-heptane. Temperatures lower than about 50° C. may be used, such as ambient temperatures, but the reaction proceeds somewhat more slowly. Higher temperatures may also be used, but there is no economic reason for going to temperatures substantially in excess of 50° C., and the temperature should always be kept below the boiling point of styrene. The polymerization should be carried out in the presence of an inert diluent, such as heptane, so that the reaction product may be readily removed from the reactor.

In order that those skilled in the art may more fully appreciate the excellent results which may be obtained by the use of my new catalysts as compared to the results obtained with the catalysts of the prior art, data obtained from a number of runs using various catalysts are presented in the following table. In all cases, the catalyst was suspended in n-heptane, and the catalyst-heptane mixture was brought to 50° C., after which an equal volume of styrene was added. The reaction was then allowed to proceed for the indicated time, after which the reaction was terminated by the addition of methanol. The solid polymer was then separated from the liquid, washed with methanol, and dried at 80° C. for two hours. It was then weighed to determine the yield based on the styrene charged. The titanium chloride complexes were prepared by reacting one mol of titanium chloride with 3 mols of the indicated aluminum compound. In the case of the titanium complexes, the indicated mol ratio of styrene to catalyst is the mol ratio of styrene to titanium chloride. In determining the solubility of the polystyrene in n-heptane, it was extracted with boiling n-heptane in a Soxhlet apparatus for six hours.

Table I

| Catalyst | Reaction time | Styrene/Catalyst Mol Ratio | Percent Yield | Soluble in Heptane, percent |
|---|---|---|---|---|
| $C_2H_5AlCl_2$ | 10 min | 100/3 | 99 | 10 |
| $C_2H_5AlCl_2$ | 1 hour | 100/3 | 100 | 10 |
| $C_2H_5AlCl_2$ | do | 1,000/3 | 97 | 10 |
| $TiCl_4C_2H_5AlCl_2$ | 1 hour | 1,000/1 | 91 | 10 |
| $TiCl_4C_2H_5AlCl_2$ | 10 min | 10,000/1 | 89 | 10 |
| $AlCl_3$ | 1 hour | 100/1 | 85 | 40 |
| $AlCl_3$ | do | 1,000/1 | 1 | |
| $(C_2H_5)_2AlCl$ | do | 100/3 | 3 | |
| $Al(C_2H_5)_3$ | do | 100/3 | 2 | |
| $TiCl_4$ | do | 100/1 | 6 | |
| $TiCl_3$ | do | 100/1 | 1 | |
| $TiCl_4Al(C_2H_5)_3$ | 4 hours | 1,000/1 | 7 | 10 |
| $TiCl_3(C_2H_5)_2AlCl$ | do | 100/1 | 7 | 10 |

As may be seen from the above table, of all the above catalysts, with the exception of the novel catalysts of this invention, only $AlCl_3$ was successful in promoting polymerization with reasonable speed, but the polymer produced was 40 percent soluble in boiling hexane, as compared to only 10 percent for the polymers produced according to the present invention. Furthermore, more catalyst is needed, since at a 1000/1 mol ratio of styrene to catalyst, $AlCl_3$ is ineffective, whereas the titanium tetrachloride-aluminum ethyl dichloride catalyst was effective to polymerize styrene with styrene/catalyst ratios as high as 10,000/1. The titanium chloride complexes with aluminum triethyl and aluminum diethyl chloride yielded polymers substantially insoluble in heptane, but the reaction rate was so slow as to make commercial polymerization unfeasible with these catalysts.

The action of my preferred catalysts in the polymerization of styrene would appear to be unique, since the catalysts exhibit no advantage over the other titanium complexes in the polymerization of other olefins, such as 4-methyl pentene-1. While in the table above, all of the aluminum alkyl halides and alkyls were ethyl, other alkyls may be used in my new process with similar results, for example, aluminum propyl dichloride or aluminum isobutyl dichloride. Similarly, when titanium trichloride or vanadium or zirconium tetrachlorides are used instead of the titanium tetrachloride in forming complexes with the aluminum alkyl dichlorides, similar results are obtained.

The invention claimed is:

1. A process for the polymerization of styrene which comprises contacting styrene admixed with an inert diluent with an aluminum alkyl dichloride wherein the alkyl group has from two to four carbon atoms, said aluminum alkyl dichloride being the sole catalyst for the polymerization reaction.

2. The process according to claim 1 in which the catalyst is aluminum ethyl dichloride.

(References on following page)

References Cited in the file of this patent

UNITED STATES PATENTS

| | | |
|---|---|---|
| 2,388,428 | Mavity | Nov. 6, 1945 |
| 2,794,819 | Smith | June 4, 1957 |
| 2,824,090 | Edwards et al. | Feb. 18, 1958 |
| 2,827,447 | Nowlin et al. | Mar. 18, 1958 |
| 2,832,759 | Nowlin et al. | Apr. 29, 1958 |
| 2,848,472 | Cottle | Aug. 19, 1958 |
| 2,852,544 | Nowlin et al. | Sept. 16, 1958 |
| 2,910,461 | Nowlin et al. | Oct. 27, 1959 |

FOREIGN PATENTS

| | | |
|---|---|---|
| 790,399 | Great Britain | Feb. 5, 1958 |
| 526,544 | Italy | May 14, 1955 |

OTHER REFERENCES

Bessant et al.: Reports of the Progress of Applied Chem., vol. 42 (1957), pages 422–41.